United States Patent
Fazio et al.

[11] Patent Number: 5,378,483
[45] Date of Patent: Jan. 3, 1995

[54] METHOD FOR PRODUCING A FROZEN NOVELTY

[75] Inventors: Paul L. Fazio, La Grange, Ill.; Bernard W. Pajak, Princeton, N.J.

[73] Assignee: The Pillsbury Company, Minneapolis, Minn.

[21] Appl. No.: 109,276

[22] Filed: Aug. 19, 1993

[51] Int. Cl.6 .............. A23G 9/00; A23P 1/00
[52] U.S. Cl. .................. 426/282; 426/101; 426/249; 426/515; 426/565
[58] Field of Search ............... 426/282, 100, 101, 249, 426/515, 565

[56] References Cited

U.S. PATENT DOCUMENTS

| | | | |
|---|---|---|---|
| 2,246,871 | 6/1941 | Balch | 426/249 |
| 2,856,868 | 10/1958 | Kennedy | 426/512 |
| 3,294,692 | 12/1966 | Kelly et al. | 252/134 |
| 3,840,311 | 10/1974 | Wight | 425/381 |
| 3,971,853 | 7/1976 | Crowder | 426/249 |
| 3,974,300 | 8/1976 | Roberts et al. | 426/565 |
| 4,268,532 | 5/1981 | Bernard | 426/513 |
| 4,288,463 | 9/1981 | Groff et al. | 426/516 |
| 4,504,511 | 3/1985 | Binley | 426/565 |
| 4,758,143 | 7/1988 | Lopes | 425/155 |
| 4,786,243 | 11/1988 | Kehoe | 426/516 |
| 4,859,165 | 8/1989 | Hoashi | 426/516 |
| 4,873,104 | 10/1989 | Butcher et al. | 426/249 |
| 4,925,689 | 5/1990 | Getman | 426/516 |
| 4,971,816 | 11/1990 | Clark et al. | 426/565 |
| 4,986,080 | 1/1991 | Grigoli et al. | 426/101 |
| 5,017,390 | 5/1991 | Sawant | 426/249 |
| 5,112,626 | 5/1992 | Huang et al. | 426/565 |
| 5,171,599 | 12/1992 | Weber | 426/549 |
| 5,209,156 | 5/1993 | Lombard | 425/132 |

*Primary Examiner*—George Yeung
*Attorney, Agent, or Firm*—Fredrickson & Byron

[57] ABSTRACT

A method for forming composite ice cream-like edible novelties having discrete doughy additions therein. The method involves first providing an extrusion apparatus including a main die having an entrance and an exit disposed downstream of the entrance, and at least one intermediate die positioned within the main die at a location upstream of the exit of the main die. An ice cream-like composition is introduced to the entrance of the main die in at least a semi-frozen state, and a flowable discrete doughy addition is extruded through the intermediate die at an elevated temperature. The ice cream-like composition and the discrete doughy addition are extruded together through the exit of the main die to form the composite ice cream-like edible novelty.

8 Claims, 3 Drawing Sheets

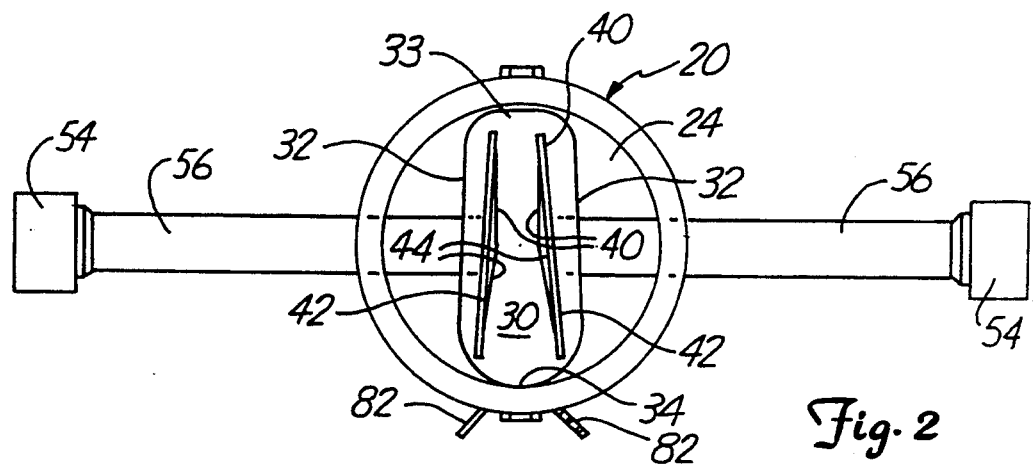
Fig. 2
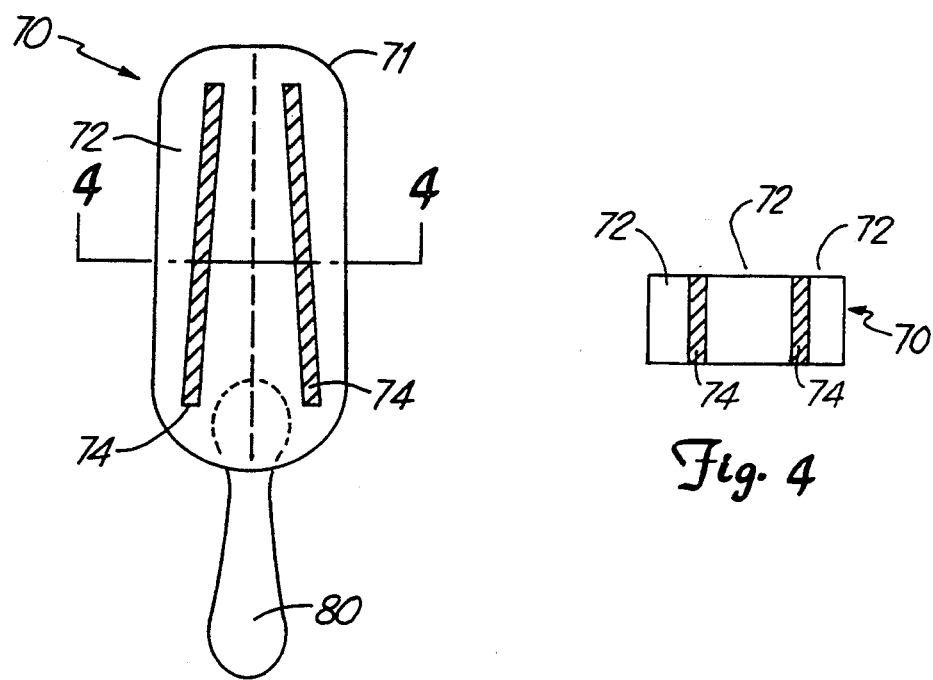
Fig. 3
Fig. 4

METHOD FOR PRODUCING A FROZEN NOVELTY

FIELD OF THE INVENTION

The present invention provides an apparatus and method for preparing an ice cream novelty product.

BACKGROUND OF THE INVENTION

A wide variety of frozen novelty products are commercially available. As consumer tastes shift over time, it becomes important for commercial producers of such novelties to alter their products to anticipate or meet consumer demand. Frozen novelties over the years have included a number of different additions to the basic formulation. For instance, ice cream novelties have been made which include spiral stripes of fudge sauce or the like along their exterior surface, chocolate coatings, or nuts sprinkled on top.

In recent years, ice cream and frozen yogurt products including additions of uncooked doughs and the like have become quite popular. These doughs have, for example, included discrete, rounded chunks of uncooked cookie dough, particularly chocolate chip and peanut butter cookie doughs. Such ice cream or frozen yogurt products are commonly made by mixing preformed, frozen or semi-frozen chunks of the cookie dough and, perhaps, other ingredients into a semi-frozen ice cream base. The chunks of dough are thoroughly mixed with the basic ice cream and this mixture is frozen to yield a fairly even distribution of dough chunks in the ice cream.

Frozen ice cream novelty bars and the like, as opposed to simple containers of ice cream products, remain quite popular for their convenience and the fact that they are generally packaged in single servings wrappers. Since ice creams and frozen yogurts including doughs and the like have gained in popularity, manufacturers have been interested in producing frozen novelty products which include such doughs.

A wide variety of methods have been used in the past to include discrete additions to frozen novelties. Such discrete additions include such things as fudge syrups (such as are used in "fudge ripple" ice creams), nuts, chocolate chips, and the like. Such flavoring agents are referred to herein as discrete additions as distinguished from vanilla or chocolate flavorings, stabilizers and the like which form a part of the substantially homogenous ice cream or yogurt phase of the novelty.

In one method of making such novelties, the novelty may be formulated in a manner substantially the same as that used for making ice cream or yogurt including discrete additions which are packaged in standard cartons and other common commercial packages for bulk ice cream. For instance, nuts or chocolate chips may be mixed in with semi-frozen ice cream and this semi-frozen ice cream mixture may be dispensed into molds. The ice cream mixtures in these molds can then be frozen to produce a novelty having the desired shape.

Other ice cream novelties which have larger, continuous phases of discrete additions can be made by a laminating process. For instance, an ice cream novelty can be produced by forming ice cream into single serving-sized bars. A discrete addition, such as a layer of caramel or the like, may then be applied to the top of each of these bars. If so desired, the composite laminated structure may then be coated with a chocolate coating or the like by being dipped in or sprayed with a chocolate coating solution.

Others have used injection techniques whereby discrete additions are injected into pre-formed shapes of ice cream and the like. In such a process, a generally homogenous ice cream or yogurt may be formed into a desired shape and an injection mechanism can be inserted into the ice cream blank. A flowable discrete addition, such as a fudge syrup or a fruit compote can be injected into the ice cream blank.

Other frozen novelties have been made by a coextrusion process. In such a process, the frozen novelty is extruded through a die having a predetermined shape and the extrudate exiting the die has a predefined form. A frozen or semi-frozen ice cream or yogurt is commonly passed through a large channel and a discrete addition is added to the flow of the ice cream or yogurt through a separate tube which extends into the ice cream flow, generally in a parallel relationship.

Such a coextrusion process is exemplified by U.S. Pat. No. 3,840,311, issued to Wight. The nature of the discrete additions which have heretofore been added in such a coextrusion process have been rather limited. In particular, the discrete additions have generally had to have substantially the same consistency and be at substantially the same temperature as the surrounding ice cream matrix. For these reasons, such coextrusion processes have generally been limited to an ice cream or yogurt composition which may have a different color or a different flavor from the generally homogenous ice cream matrix with which it is coextruded.

None of the processes outlined above would appear to be particularly effective for use in adding uncooked doughs and the like to frozen novelties. It is believed that consumers generally prefer these discrete additions of doughs to be in relatively large chunks to accentuate the heterogeneity of the product. The presence of such discrete additions in a product formed by the aforementioned methods can either make the forming method relatively difficult to execute or yield an uneven product with an undesirable appearance. For instance, if one were to add a dough in the lamination process outlined above, one would have to form the dough into sheets and cut the sheets into smaller, thin sections of about the same dimensions as the underlying ice cream base. Applying these sheets of dough could be rather difficult in that the dough sheets could present handling difficulties, and ensuring proper placement of the pre-formed sheet on each and every bar could be difficult to execute.

Accordingly, it would be desirable to have a method for forming a frozen novelty including a dough or other similar product as a discrete addition. Such a method should yield reproducible results and the resulting frozen novelty should have a uniform, attractive appearance.

SUMMARY OF THE INVENTION

The present invention provides a method for forming composite frozen novelties which comprise an ice cream-like dessert composition having discrete doughy additions therein. The dessert composition of the frozen novelties may be formed of an ice cream, a frozen yogurt, or any other like product. In accordance with the invention, a frozen novelty having a discrete doughy addition in an ice cream-like dessert composition is formed by first providing an extrusion apparatus including a main die having an entrance and an exit disposed downstream of the entrance, and at least one intermediate die, the intermediate die being positioned within the main die at a location upstream of the exit of the main die. An ice cream-like dessert composition is introduced to the entrance of the main die in at least a semi-frozen state. A flowable discrete doughy addition is extruded through the intermediate die at an elevated temperature. In one preferred embodiment, this elevated temperature is at least about 50° F. The dessert composition and the discrete doughy addition are extruded together through the exit of the main die to form a composite extrudate.

BRIEF DESCRIPTION OF THE DRAWINGS

FIG. 2 is an end view of a portion of the extrusion apparatus of FIG. 1;

FIG. 3 is an end view of a frozen novelty made in accordance with one embodiment of the invention;

FIG. 4 is a cross sectional view of the frozen novelty of FIG. 3; and

DETAILED DESCRIPTION

Figure 1:
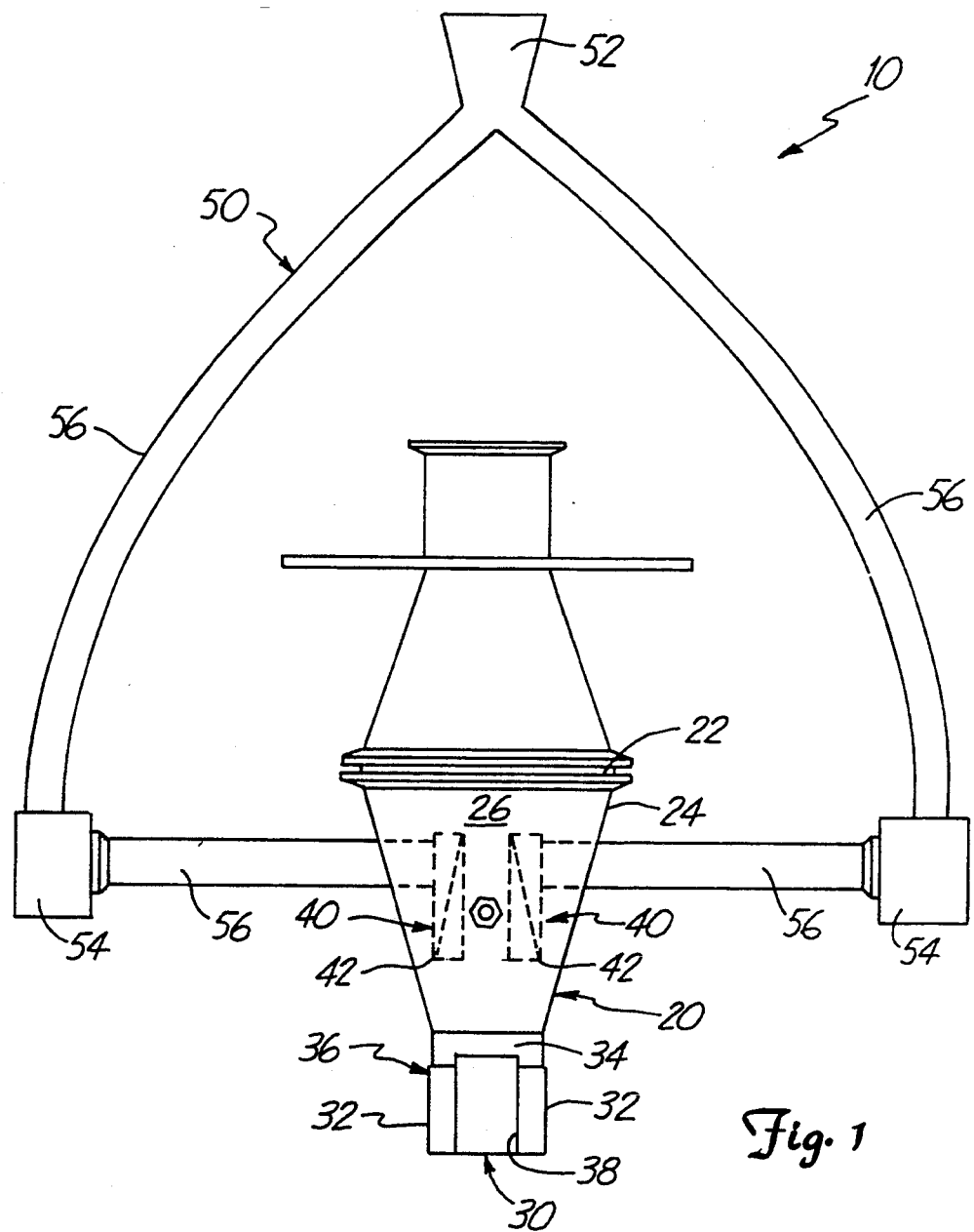
FIG. 1 is a schematic top view of an extrusion apparatus for use in accordance with the invention.

In accordance with the present invention, a frozen novelty product (70 in FIGS. 3 and 4) is made by a coextrusion process having carefully controlled parameters, as outlined below. FIGS. 1 and 2 illustrate one possible apparatus for use in carrying out the method of the invention. The extrusion apparatus, generally designated as 10, includes a main extrusion die 20 and at least one intermediate extrusion die 40.

The main die 20 has an entrance 22 and an exit 30, with the exit being disposed generally downstream of the entrance 22 when the die is in use, i.e. material passing through the die moves from the entrance toward the exit. The main die 20 also includes a wall 24 which extends between the entrance and the exit, thereby defining an inner cavity 26 of the main die. In a preferred embodiment, the wall 24 is generally conical in shape and decreases in cross sectional area in a direction from the entrance toward the exit.

The exit 30 of the main die can be of any desired shape. It is contemplated, though, that the peripheral shape of the frozen novelty (70 in FIGS. 3 and 4) will be defined by the shape of the exit—the material being extruded will be forced under pressure through the exit and will be deformed by the die as it passes through the exit. Accordingly, the exit should be shaped in substantially the same size and configuration as that desired of the frozen novelty being produced.

In the embodiment shown, for example, the exit comprises a pair of generally opposed sidewalls 32 and generally parallel top and bottom walls (33 and 34, respectively). The opposed sidewalls 32 in FIGS. 1 and 2 generally taper toward one another in the direction of the top wall 33 such that the orifice defined by the walls, i.e. the exit 30, is narrower adjacent the top wall than it is adjacent the bottom wall. As can be seen from FIG. 3, the resulting frozen novelty 70 has a peripheral shape which closely follows that of the exit.

If so desired, the walls 32, 33, and 34 defining the exit may also include a neck 36 disposed between the generally conically shaped wall 24 of the body of the die. This will serve to effectively channel the flow of material through the die and will minimize the amount of material which becomes trapped in quiescent areas of the die. The use of such a neck in an extrusion die has been used for much the same purpose in, for example, in extruding plastics and the like.

The extrusion apparatus 10 also includes at least one intermediary die 40. In the embodiment shown in the drawings, the extrusion apparatus includes two separate intermediate dies. It is to be understood, though, that any suitable number of dies may be employed to distribute the discrete doughy additions passed therethrough in the frozen novelty 70 in a desired configuration.

The intermediate die or dies 40 are positioned within the inner cavity 26 of the main die. In a preferred embodiment, the intermediate die is disposed at a position along the extrusion axis, i.e. the direction in which the material passing through the main die flows, between the entrance 22 and exit 30 of the main die. As shown in FIGS. 1 and 2, it is preferred that the exit 42 of the intermediate die 40 is positioned slightly behind the neck 36 of the main die. This helps ensure that the material passing through the inner cavity 26 of the main die intimately contacts the material exiting the intermediate die(s) as the final narrowing of the inner cavity will tend to urge the ice cream-like material in the main die into contact with the discrete doughy addition exiting the intermediate die. In one embodiment which has been found to work well, the intermediate die is positioned about 11.5 inches behind the position at which the handle is inserted into the extrudate, as detailed below.

The intermediate die or dies 40 generally include an extrusion chamber 44 and an exit 42. Preferably, the extrusion chamber 44 tapers toward the exit so that material being passed through the intermediate die will be forced through the exit of the die under pressure and therefore assume the shape of the exit. Hence, the shape of the exit tends to define the general shape and size of the addition (74 in FIGS. 3 and 4) in the final frozen novelty 70. In the illustrated embodiment, each of the two intermediate dies has a relatively thin, elongate exit orifice, which may, for instance, be on the order of about $\frac{1}{8}$" wide and about 3–3$\frac{1}{8}$" long. As detailed below in connection with FIGS. 3 and 4, this yields a relatively oblong strip of the discrete doughy addition in the frozen novelty.

In one desired embodiment, a pair of such dies are arranged in the internal chamber in a spaced-apart relationship. Although the exits of the dies could be generally parallel to one another, in the embodiment of FIGS. 1–4 the dies are oriented at an angle to one another, with the exits 42 of the intermediate dies being closer to one another near the top wall 33 of the main die exit than they are near the bottom wall 34 of the main die exit. It is to be understood, though, that the exits of these intermediate dies may be of any suitable shape and the relative position of the dies can be arranged in any useful configuration to yield a desired product; the dies may be arranged, for example, to define an artistic or representative design.

The intermediate die 40 of the extrusion apparatus 10 is provided with a supply of the desired discrete doughy addition. In the apparatus shown in the drawings, a supply of the discrete doughy addition is provided to the pair of intermediate dies 40 via supply system 50. This supply system includes a stream splitter 52, flow metering means 54, and a pair of delivery conduits 56. In this embodiment, a single supply stream of the discrete doughy addition is provided to the supply system and is divided into two substantially equal flows of the addition by means of the stream splitter 52. These separated streams pass through the delivery conduits 56 and into the intermediate dies. The flow metering means desirably is capable of detecting the flow through each delivery conduit and use this information to balance the flows through the delivery conduits so that they are substantially equal to one another. Such metering means are commercially available.

Since the intermediate dies 40 are positioned within the inner cavity 26 of the main die, the delivery conduits 56 must intrude into this cavity 26 to deliver the material to the intermediate dies. If so desired, the delivery conduits may be arranged generally along the direction in which the dessert composition flows through the main die and extend from the entrance 22 of the main die forwardly to a rearward portion of the intended intermediate die. This will tend to minimize any disruption in the flow of the dessert composition.

In the depicted embodiment, though, the delivery conduits 56 extend into the inner cavity of the main die in a direction generally perpendicular to the flow of the dessert composition. The delivery conduits are desirably spaced away from the exit 30 of the main die, though, at a position wherein the wall 24 of the main die is still tapering inwardly toward the exit. Sufficient space should be allowed for the dessert composition to flow around the delivery conduits yet be urged back into a substantially solid mass again before exiting the die 20. This will help avoid unwanted air pockets in the frozen novelty 70 created when the dessert composition separates to flow around the delivery conduits.

Figure 5:
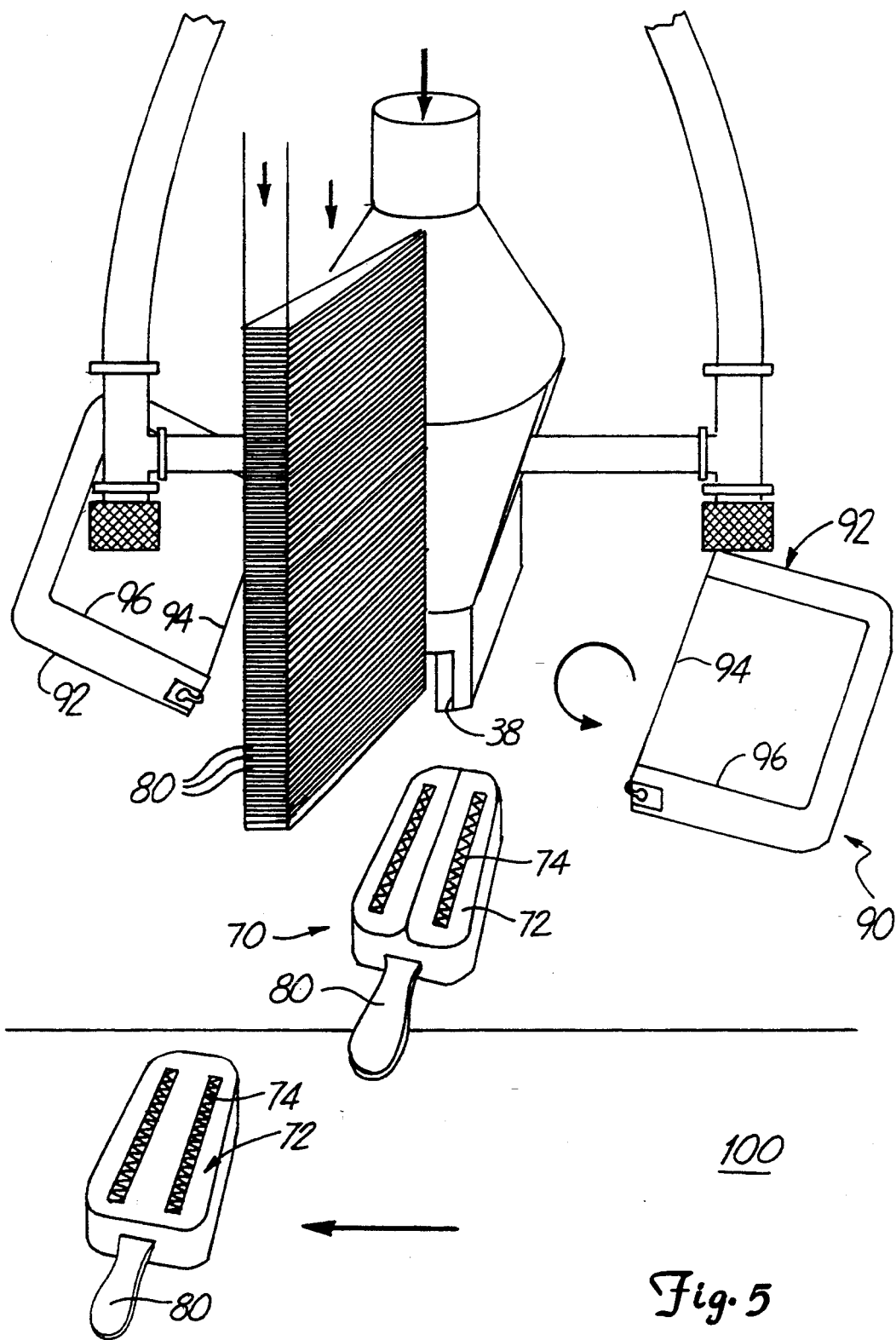
FIG. 5 is a schematic perspective view of the extrusion apparatus of FIG. 1 in conjunction with automated equipment for use in an automated production environment.

FIG. 5 schematically illustrates the extrusion apparatus 10 of the invention positioned for use in an automated production environment. In this embodiment, the extrusion apparatus is positioned with the extrusion axis (i.e. the direction in which the extrudate flows) oriented generally vertically, with the exit 30 of the main die being oriented generally downwardly. A conveyor 100 may be positioned beneath the exit 30 so that individual novelties 70 can be dropped from the exit onto the conveyor. The conveyor may be of any desired construction; a standard conveyor belt made of food grade plastic materials should suffice.

In the configuration of FIG. 5, the extrudate exiting the extrusion apparatus is severed into a series of discrete lengths by means of a cutting device. The length of the severed portions of the extrudate is optimally selected to yield a frozen novelty of the desired size. The cutting device may be of any suitable type known in the art, but in the preferred embodiment shown in the drawing, the cutting device 90 comprises a pair of opposed wire cutters 92. These wire cutters include a length of a wire 94 extending between arms of a frame 96 to hold the wire rigidly in place.

The wires of the wire cutters 90 are moved generally toward one another, cutting through the extrudate. In the version depicted in FIG. 5, the wire cutters move toward one another with the wires 94 oriented in a direction generally parallel to the strips of the discrete doughy additions 74. It is to be understood, though, that the wire cutters could be oriented at any angle, such as generally perpendicular to the additions 74. Bringing the wire cutters 92 toward one another will tend to seer the extrudate to allow an appropriately sized length of the extrudate to fall onto the conveyor 100 for further processing, outlined below.

FIG. 5 also schematically illustrates an optimal location for inserting handles 80 into the frozen novelties 70. In this embodiment, the exit of the die is provided with a slot 38 (best seen in FIG. 1) through which a handle may be inserted into the extrudate as it exits the die. In the configuration shown in FIG. 5, the handles (which may be of any suitable manually graspable shape) are stacked atop one another adjacent the slot 38 in the exit of the die. As best seen in FIG. 2, the surface of the die may be provided with a pair of opposed fingers 82 which serve as a guide for the ends of the handles in the stack. Handles may be urged into the slot and imbedded in the extrudate at suitable intervals to provide a handle for each frozen novelty produced.

In accordance with the method of the invention, an ice cream-like dessert composition (72 in FIGS. 3 and 4) is introduced to the main die 20 through its entrance 22 and a discrete doughy addition (74 in FIGS. 3 and 4) is passed through the intermediate die or dies 40. The ice cream-like dessert composition may be made of any desired formulation. For instance, in one particularly preferred embodiment it is formed of a composition typical of the type normally used in commercially produced ice creams, including milk protein, sweetening agents, starch, and water, and may contain flavoring agents, stabilizers and the like. One suitable example of such a composition is set forth in U.S. Pat. No. 5,122,626, issued to Huang, et al., the teachings of which are incorporated herein by reference.

It is to be understood, through, that the ice cream-like dessert composition need not be an ice cream product. For instance, this dessert composition may instead be an ice milk product or a frozen yogurt product. A variety of non-dairy alternatives having a consistency or flavor resembling ice cream, such as soy-based ice cream substitutes, are also known in the art and could easily be used in the dessert composition of the present invention. Although the dessert composition in one preferred embodiment of the invention is smooth and relatively homogenous, one could include discrete additions such as fudge syrups and relatively small particulate inclusions, e.g. chocolate chips, nuts or the like, which will not interfere with the effective extrusion of the dessert composition through the main die 20.

The discrete doughy addition 74 of the frozen novelty can be of any desired composition which can be suitably extruded through the intermediate die(s) 40 at an appropriate temperature. As explained below, the flowable discrete doughy addition is optimally extruded at an elevated temperature and has a viscosity of between about $5 \times 10^5$ and $5 \times 10^6$ centipoise. Any desired formulation which can meet these parameters and be passed through the exit of the intermediate die to yield a generally contiguous mass will be suitable for a frozen novelty 70 of the present invention.

Although the discrete doughy addition need not be formed of a dough, in the preferred embodiment of the invention this addition 74 is formed of a confectionery dough composition. For instance, the addition 74 may comprise a substantially uncooked brownie dough, which may have been heated to about 200 degrees Fahrenheit or more for the purpose of reducing microbial contamination, but the dough may remain substantially uncooked. In another exemplary embodiment, the addition comprises an uncooked cookie dough of a composition analogous to those used in commercially produced refrigerated cookie doughs.

In one specific example, the addition 74 may comprise a chocolate chip cookie dough having about 24 weight percent (wt. %) sugar, about 28 wt. % flour, about 0.49 wt. % each of soda and salt, about 0.78 wt. % egg yolk solids, about 0.89 wt. % albumin, about 13 wt. % shortening, about 1.55 wt. % oil, about 10 wt. % water, about 2.1 wt. % molasses, about 0.1 wt. % vanilla, about 17 wt. % candy pieces, and other trace amounts of other desired enrichments and flavorings. Such a cookie dough can be prepared in any conventional manner. U.S. Pat. No. 5,171,599, issued to Weber (the teachings of which are incorporated herein by reference) teaches a dough having such a composition.

It has been discovered, though, that the presence of sizeable particulates in the doughy addition, such as chocolate chips and the like, can interfere with uniform, simple extrusion of the addition. Accordingly, in some embodiments, it may be desirable to use a formulation analogous to the one outlined immediately above, with the candy pieces being omitted. As another example, it has been found that a sugar cookie dough, such as is commercially available from Guernsey Dell of Chicago, Ill., is suitable for use in the invention.

In forming a frozen novelty 70 in accordance with the instant method, a desired ice cream-like dessert composition (72 in FIGS. 3 and 4) is supplied to the inner cavity 26 of the main die through the entrance 22 of that die. This dessert composition is maintained in at least a semi-frozen state when it is introduced, but it may be in a frozen state. In order to achieve the desired state of the dessert composition, it is desirably maintained at a temperature of no more than about 32° F. (° C.) and is preferably held at a lower temperature. For instance, a commercial ice cream mixture may be maintained at about 20° F. (−7° C.), yielding an ice cream having the consistency of "soft serve" ice cream, while a commercial composition for frozen yogurt may optimally be maintained at a temperature of about 17°-18° F. (about −8° C.).

This chilled dessert composition is supplied to the main die 20 under pressure, forcing the dessert composition through the die in a direction from the entrance 22 to the exit 30. Optimally, the dessert composition will have a viscosity on the order of about 100,000 centipoise.

The discrete doughy addition, however, is introduced to the supply system 50 of the invention at an elevated temperature. Confectionery doughs and the like tend to become rather firm and have rather poor flow characteristics at low temperatures. Accordingly, if a conventional confectionery dough were introduced into the extrusion apparatus 10 in a chilled state, e.g. about the same temperature as the dessert composition, it would be rather difficult to produce a frozen novelty 70 with an attractive, generally contiguous mass of the discrete doughy addition 74. Although one could possibly alter the composition of the addition 74 to make it flow more easily at lower temperatures, this would likely adversely affect the processing parameters used in making the frozen novelties and could affect the flavor and other organoleptic properties of the addition.

In order to ensure good flow properties in the discrete doughy addition, the addition is optimally introduced to the extrusion apparatus 10 at a temperature of at least about 50° F., and perhaps significantly higher. The addition should be maintained in a range of about 500,000 to about 5,000,000 centipoise and the viscosity of the addition will generally be positively correlated with temperature. The actual temperature selected will depend on a number of factors, including the formulation of the addition 74 and the viscosity of the addition as a function of temperature.

For example, it has been found that a sugar cookie such as that commercially available from Guernsey Dell, noted above, introduced to the supply system 50 at a temperature of about 55°-75° F. (about 13°-24° C.) yields an acceptable final frozen novelty. If a somewhat stiffer addition is extruded, though, the temperature may need to be even higher; if the discrete doughy addition is a brownie dough, the temperature at which it is introduced to the supply system may range as high as about 115° F. (about 45° C.), depending upon the formulation of the brownie dough.

The discrete doughy addition 74 is supplied to the intermediate extrusion dies 40 at an elevated temperature and under pressure sufficient to cause the addition to flow through the dies at about the same linear speed as the dessert composition 72 in the inner cavity 26 of the main die. This will help ensure that the two components of the composite frozen novelty, namely the dessert composition 72 and the doughy addition 74, will exit the main die at about the same linear rate, yielding a more uniform product. (The linear speed of extrusion is a more reliable measure than the volumetric flow rate of the components because the relative volumes of the dessert composition and the addition in the desired frozen novelty may be significantly different.)

In the past, ice cream products and the like which have been coextruded have generally been formed of materials which are rather similar in characteristics such as viscosity and, perhaps more importantly, temperature. For instance, in the process suggested by Wight noted above, two slightly different ice cream compositions are coextruded. These ice creams would be of similar compositions and are apparently extruded at about the same temperature and have very similar viscosities. In the present invention, though, the discrete doughy additions 74 will tend to exhibit rather poor flow characteristics at the temperatures used to extrude the dessert composition and the viscosities of these two components tend to be markedly different. As noted above, the dessert composition optimally has a viscosity on the order of about 100,000 centipoise, but the doughy addition has a viscosity on the order of about 500,000-5,000,000 centipoise, i.e. the doughy addition has a viscosity which is optimally at least about five times that of the dessert composition.

It has been found that extruding the dessert composition at a temperature of no more than about 32° F. and introducing the doughy addition at an elevated temperature can yield the desired flow rates. One might expect the introduction of a warm or hot addition to a chilled dessert composition would have deleterious consequences on the dessert composition, such as poor texture due to rapid melting and subsequent refreezing. Surprisingly, this marked temperature difference between the dessert composition and the addition does not significantly adversely affect frozen novelties made in accordance with the present invention.

The extrudate (not shown in FIGS. 1 and 2) leaving the exit 30 of the main die will therefore have a relatively warm doughy addition in a chilled dessert composition. This extrudate is then introduced to a freezing chamber, which is optimally maintained at a temperature of no more than about −35° F. (about −37° C.) and is held in the freezing chamber for sufficient time to chill the extrudate down to a suitable storage temperature, e.g about −20° F. (about −29° C.). In order to accelerate the cooling of the extrudate, the freezing chamber may optimally be maintained at an even lower temperature, such as about −50° to about −60° F. (about −45° to about −51° C.). The freezing chamber may be of any desired construction and need not necessarily be enclosed, provided that the extrudate is held in an environment maintained at the desired temperature.

If the pressure in the main and intermediate dies (20 and 40, respectively) is held at a constant elevated pressure, the extrudate will tend to be formed as a long, continuous log. Since most frozen novelties are provided in single serving-sized portions, this long log will generally have to be divided into a series of separate bars (71 in FIGS. 3 and 4) of a desired thickness and weight. This may be accomplished in any desired fashion. For instance, the log may be divided into separate bars by means of the cutting device 90 outlined above.

In an alternative embodiment, the pressure applied to the main and intermediate dies is not held at a substantially constant level for extended periods of time. Instead, the pressure is varied to yield a series of periods of high pressure separated by periods of relatively low pressure. This pulse extrusion technique would form the extrudate in a series of short segments, with extrusion substantially stopping during the periods of relatively low pressure. By effectively controlling the length of the high pressure pulses, the length of the extrudate generated in these pulses can be reproducibly controlled. The cutting device 90, outlined above, may then be used to sever the extruded segment from the material remaining in the die.

The relative proportions of the dessert composition and the discrete doughy addition can be varied as desired. A bar having about 5 wt. % to about 40 wt. % of the doughy addition is generally preferred, but this relative weight percentage can be varied.

While a preferred embodiment of the present invention has been described, it should be understood that various changes, adaptations and modifications may be made therein without departing from the spirit of the invention and the scope of the appended claims.

What is claimed is:

1. A method of producing a composite edible novelty having a discrete doughy addition in an ice cream-like dessert composition comprising the steps of:
   a. providing an extrusion apparatus including a main die having an entrance and an exit disposed downstream of the entrance, and at least one intermediate die, the intermediate die being positioned within the main die at a location upstream of the exit of the main die;
   b. introducing the dessert composition to the entrance of the main die in at least a semi-frozen state;
   c. extruding a flowable discrete doughy addition through the intermediate die at an elevated temperature of at least about 50° F.; and
   d. extruding the dessert composition and the discrete doughy addition through the exit of the main die to form an extrudate.

2. The method of claim 1 wherein the dessert composition is provided to the entrance of the die at a temperature of no more than about 32° F.

3. The method of claim 1 further comprising the step of introducing the extrudate to a freezing chamber maintained at a temperature of no more than about −35° F.

4. The method of claim 3 wherein the extrudate is held in said freezing chamber for a period of time sufficient to substantially freeze the entire extrudate.

5. The method of claim 1 wherein the viscosity of the discrete doughy addition is maintained between about 500,000 centipoise and about 5,000,000 centipoise.

6. The method of claim 3 further comprising the step of inserting a manually graspable handle into the extrudate.

7. A method of producing a composite edible novelty having a discrete doughy addition in an ice cream-like dessert composition comprising the steps of:
   a. providing an extrusion apparatus including a main die having an entrance and an exit disposed downstream of the entrance, and at least one intermediate die, the intermediate die being positioned within the main die at a location upstream of the exit of the main die;
   b. introducing a dessert composition to the entrance of the main die in at least a semi-frozen state and at a temperature of no more than about 32° F.;
   c. extruding a flowable discrete doughy addition through the intermediate die at an elevated temperature of at least about 50° F., the doughy addition having a viscosity of between about 500,000 centipoise and about 5,000,000 centipoise;
   d. extruding the dessert composition and the discrete doughy addition through the exit of the main die to form a composite extrudate; and
   e. introducing the extrudate to a freezing chamber maintained at a temperature of no more than about −35° F. and holding the extrudate in the freezing chamber for a period of time sufficient to substantially freeze the entire extrudate.

8. The method of claim 7 wherein the extrudate is divided into separate bars before exiting the freezing chamber.

* * * * *